US011765752B2

(12) United States Patent
Sevindik

(10) Patent No.: US 11,765,752 B2
(45) Date of Patent: Sep. 19, 2023

(54) MILLIMETER WAVE ACCESS SYSTEM FOR DEVICE TO DEVICE COMMUNICATION

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 66 days.

(21) Appl. No.: 17/527,271

(22) Filed: Nov. 16, 2021

(65) Prior Publication Data

US 2022/0182996 A1   Jun. 9, 2022

Related U.S. Application Data

(63) Continuation of application No. 17/116,145, filed on Dec. 9, 2020, now Pat. No. 11,219,028.

(51) Int. Cl.
*H04W 4/029* (2018.01)
*H04W 72/51* (2023.01)
(Continued)

(52) U.S. Cl.
CPC ........... *H04W 72/51* (2023.01); *H04W 4/029* (2018.02); *H04W 76/14* (2018.02); *H04W 92/18* (2013.01)

(58) Field of Classification Search
CPC ......... H04W 72/23; H04W 4/02; H04W 4/80; H04W 16/14; H04W 72/51; H04W 76/14; H04W 4/029; H04W 92/18
See application file for complete search history.

(56) References Cited

U.S. PATENT DOCUMENTS 10,070,474 B2   9/2018  Wietfeldt et al.
10,893,417 B1 *  1/2021  Gandhi ............... H04W 48/08
(Continued)

OTHER PUBLICATIONS

Fareha Nizam et al: "Dynamic Spectrum Algorithm Based on D2D Communication" International Journal of Recent Technology and Engineering (IJRTE), ISSN: 2277-3878, vol. 8, Issue 3S, Oct. 2019, pp. 157-163, DOI: 10.35940/ijrte.C1028.1083S19.

*Primary Examiner* — Congvan Tran
(74) *Attorney, Agent, or Firm* — Young Basile Hanlon & MacFarlane, P.C.

(57) ABSTRACT

Millimeter wave access system and method for device-to-device communications (D2D) are described. A method includes registering, by one or more Citizens Broadband Radio Service (CBRS) devices (CBSDs) with a millimeter wave spectrum access system (MAS), establishing, by mobile devices, connections with a CBSD, receiving D2D communication mode capability from the mobile devices, receiving millimeter wave spectrum allocation requests for D2D communication from a number of the plurality of mobile devices, determining, by the MAS, millimeter wave spectrum allocation for the requests, sending, by the MAS and the CBSD, appropriate millimeter wave spectrum allocations to each of requesting mobile device and enabling D2D communication mode, establishing D2D communication links with other mobile devices to exchange data, monitoring idle time percentage on the D2D communication links, informing when D2D communication is not needed based on the idle time percentage, and releasing allocated millimeter wave spectrum when D2D communication is not needed.

20 Claims, 4 Drawing Sheets

(51) Int. Cl.
*H04W 76/14* (2018.01)
*H04W 92/18* (2009.01)

(56) References Cited

U.S. PATENT DOCUMENTS

| | | | | |
|---|---|---|---|---|
| 2011/0268004 | A1* | 11/2011 | Doppler | H04W 72/02 370/329 |
| 2013/0054050 | A1* | 2/2013 | Filev | B60W 50/0097 701/2 |
| 2018/0332660 | A1* | 11/2018 | Mueck | H04W 48/10 |
| 2019/0335336 | A1 | 10/2019 | Cimpu et al. | |
| 2019/0357252 | A1* | 11/2019 | Sun | H04W 74/0808 |
| 2019/0394704 | A1 | 12/2019 | Lou et al. | |
| 2020/0154501 | A1* | 5/2020 | Cheng | H04W 4/70 |
| 2020/0235875 | A1 | 7/2020 | Sha et al. | |
| 2020/0288410 | A1 | 9/2020 | Chang et al. | |
| 2020/0305159 | A1 | 9/2020 | Raghothaman et al. | |
| 2020/0351882 | A1 | 11/2020 | Furuichi | |
| 2020/0374707 | A1 | 11/2020 | Ashrafi | |
| 2021/0013954 | A1 | 1/2021 | Zhao et al. | |
| 2021/0136838 | A1* | 5/2021 | Khalid | H04L 41/5019 |
| 2021/0153029 | A1* | 5/2021 | Mueck | H04W 16/14 |
| 2021/0175919 | A1 | 6/2021 | Badic et al. | |
| 2021/0219143 | A1* | 7/2021 | Khalid | H04W 8/005 |
| 2022/0029691 | A1* | 1/2022 | Yu | H04W 76/19 |
| 2022/0141844 | A1* | 5/2022 | Sevindik | H04L 61/5007 370/329 |
| 2023/0007483 | A1* | 1/2023 | Mueck | H04W 12/069 |

* cited by examiner

MILLIMETER WAVE ACCESS SYSTEM FOR DEVICE TO DEVICE COMMUNICATION

CROSS REFERENCE TO RELATED APPLICATION

This application is a continuation of U.S. application Ser. No. 17/116,145 filed Dec. 9, 2020, of which is incorporated herein by reference.

TECHNICAL FIELD

This disclosure relates to wireless communications. More specifically, this disclosure relates to device-to-device communications.

BACKGROUND

Device-to-device (D2D) communication is a capability where two or more mobile devices can communicate with each other without the assistance of a base station. D2D communications can occur in licensed or unlicensed spectrum in cellular networks. The mobile device connects to a base station, which in turn assigns a bandwidth of unicast spectrum to the mobile device to use for D2D communication. Once assigned, the mobile devices can send and receive data to with each other. However, since the base station has to manage spectrum, conventional D2D processes are inefficient. Moreover, since part of the unicast spectrum is assigned for D2D communications, bandwidth utilization efficiency can decrease. This is exacerbated in the event shared spectrum is being used. For example, in a Citizens Broadband Radio Service (CBRS) or shared spectrum network, a Spectrum Access System (SAS) assigns or grants shared spectrum to a CBRS device (CBSD). The SAS manages the shared spectrum based on interference determinations and can withdraw the shared spectrum at any time. However, CBSDs are unable to switch D2D communications off once D2D once initiated by the mobile device. Consequently, a variety of issues arise.

SUMMARY

Disclosed herein is a millimeter wave access system and method for device-to-device communications (D2D). In implementations, a method includes registering, by one or more Citizens Broadband Radio Service (CBRS) devices (CBSDs) with a millimeter wave spectrum access system (MAS), establishing, by a plurality of mobile devices, connections with a CBSD of the one or more CBSDs, receiving, by the CBSD, D2D communication mode capability from the plurality of mobile devices, receiving, by the CBSD, millimeter wave spectrum allocation requests for D2D communication from a number of the plurality of mobile devices, determining, by the MAS, millimeter wave spectrum allocation for the requests based on spectrum determination parameters, base station location, and mobile device location estimation, sending, by the MAS and the CBSD, appropriate millimeter wave spectrum allocations to each of requesting mobile device and enabling D2D communication mode, establishing, by each spectrum allocated mobile device, D2D communication links with other mobile devices to exchange data, monitoring, by each spectrum allocated mobile device, idle time on the D2D communication links, informing, the base station, when a D2D communication is no longer needed based on the idle time, and releasing, by the CBSD and the MAS, allocated millimeter wave spectrum when D2D communication is no longer needed.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
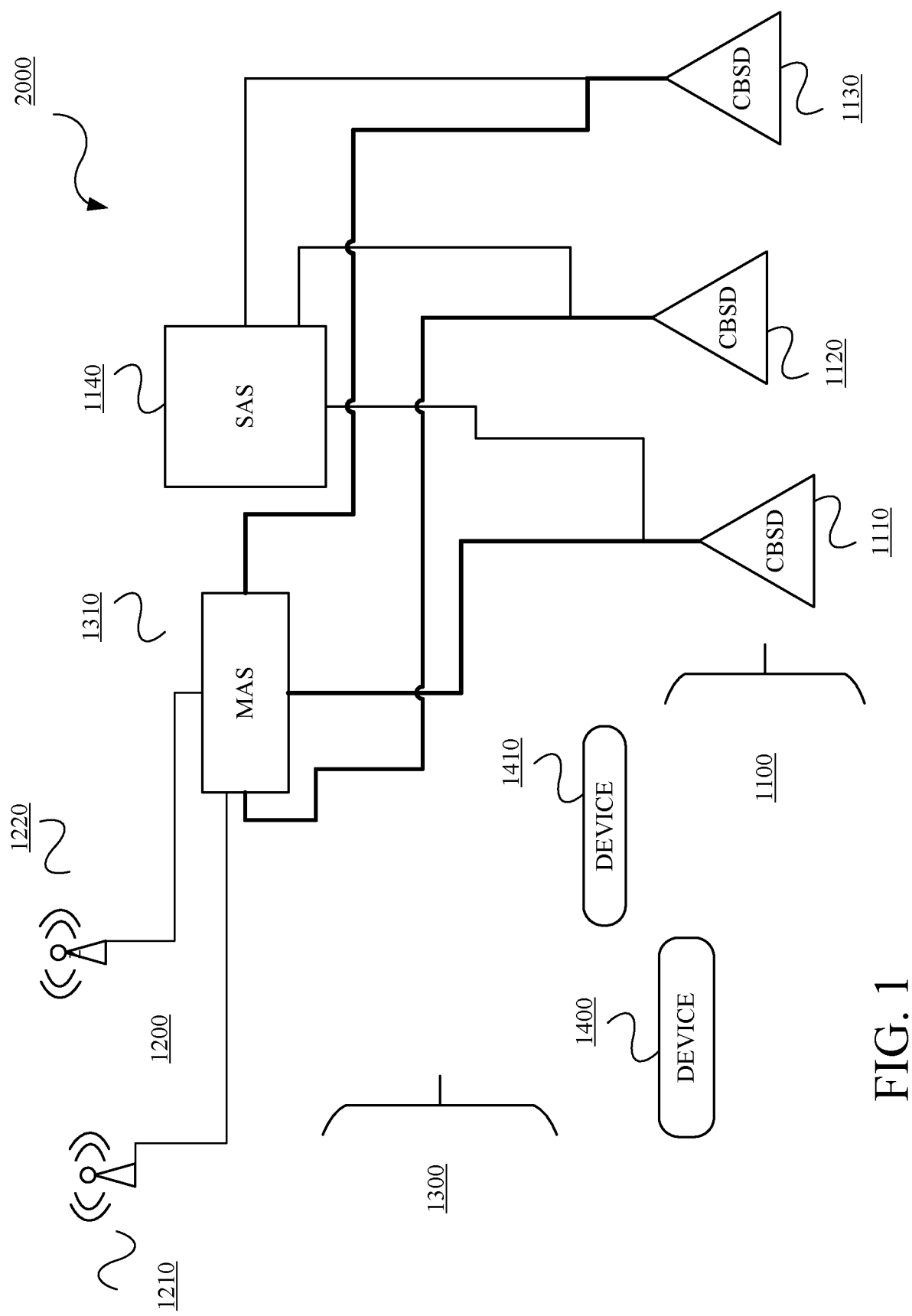
FIG. 1 is a diagram of an example of a millimeter wave access system in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are millimeter wave access systems and methods for device-to-device (D2D) communication. In implementations, mobile devices can be assigned millimeter wave spectrum for D2D communication in contrast to the spectrum used by a base station for communications. In implementations, the millimeter wave spectrum used for D2D communication can be spectrum above 6 GHz. In implementations, the millimeter wave spectrum used for D2D communication can be from approximately 30-300 GHz. In implementations, the millimeter wave spectrum used for D2D communication can be from approximately 70-90 GHz. In implementations, the millimeter wave spectrum can be licensed, unlicensed, shared, and/or combinations thereof.

In implementations, a millimeter wave spectrum access system (MAS) can be used to manage the millimeter wave spectrum for D2D communication or non-unicast communications in contrast to a spectrum access system (SAS) which is used for Citizens Broadband Radio Service (CBRS) or shared spectrum network, for example. In implementations, the MAS can manage spectrum beyond 6 GHz including any spectrum band between 70-90 GHz.

In implementations, a base station in cooperation with the MAS can assign or allocate a spectrum band in response to a request from the mobile device to perform D2D communication. In implementations, the base station, the MAS, and/or combinations thereof can use mobile device type, operating spectrum, spectrum type, proximity, and/or other parameters to assign the millimeter wave spectrum band. The mobile device can then, using discovery techniques, sense other mobile devices with which to establish peer-to-peer connections and exchange data. As mobile devices which are D2D capable are usually proximate to each other when requesting D2D mode, the millimeter wave spectrum is well-suited for D2D discovery.

In implementations, D2D processing can be initiated by the base station if a threshold number of mobile devices are requesting or are in D2D mode. In implementations, the mobile device can self-monitor to determine whether D2D communication links are active or idle. The mobile device can inform the base station to release allocated spectrum for unicast communication if no longer needed for D2D communication.

FIG. 1 is a diagram of an example of a system 1000 in accordance with embodiments of this disclosure. In an implementation, the system 1000 may include a Citizens Broadband Radio Service (CBRS) or shared spectrum network 1100 (collectively "shared spectrum network"), a 4G licensed spectrum network, a 5G licensed spectrum network, or other licensed spectrum network 1200 (collectively "licensed spectrum network"), and a millimeter wave network 1300 (collectively "local wireless network"). The wireless communication systems are examples and other wireless communication systems can be used without departing from the scope of the specifications or claims. Mobile devices or terminals 1400 and 1410 can be connected to or in communication with one or more of the shared spectrum network 1100 and/or the licensed spectrum network 1200. The number of mobile devices or terminals is illustrative and the architecture 1000 may include more or less base stations. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

In implementations, the millimeter wave network 1300 can include a MAS 1310 to manage the millimeter wave spectrum for D2D communication. In implementations, the MAS 1310 can, for example, allocate and assign the millimeter wave spectrum based on a variety of parameters, including but not limited to, mobile device type, operating spectrum, spectrum type, proximity, and/or other like parameters ("spectrum determination parameters"). The amount of millimeter wave spectrum allocated can vary depending on data traffic estimated based on the parameters. The mobile device type can be representative of, for example, how much data is going to be sent. For example, if the mobile device type is an ambulance it could need a 5 MHz bandwidth whereas a mobile phone could need 2 MHz. In implementations, the MAS 1310 can include a look-up table or the like to track millimeter wave spectrum allocation. In implementations, the MAS 1310 can include location determination techniques or methods to determine a position of a mobile device based on a location of a base station, sound reference signal (SRS) measurements from the mobile device, received power measurements from the mobile device, and the like. The MAS 1310 can then determine a mobile device density, which can be used for millimeter wave spectrum allocation determination. In implementations, the MAS 1310 can be implemented as part of a service provider system. In these instances, the base station can share the mobile device type. In implementations, the MAS 1310 can be implemented as a third party system. In these instances, the base station does not share the mobile device type.

In implementations, the licensed spectrum network 1200 can include base stations 1210 and 1220. The number of base stations is illustrative and the architecture 1000 may include more or less base stations. The base stations 1210 and 1220 can connect to or register with the MAS 1310 to collectively allocate millimeter wave spectrum to mobile devices requesting D2D communication mode.

In implementations, the CBRS network 1100 can include CBRS devices (CBSDs) 1110, 1120, and 1130. In implementations, the number of CBSDs is illustrative and the architecture 1000 can include more or less CBSDs. The architecture 1000 can include a Spectrum Access System (SAS) 1140 which is in communication with each of the CBSDs 1110, 1120, and 1130 as described herein. The CBRS spectrum is a type of shared spectrum, license-by-rule spectrum, or lightly licensed spectrum which is shared between multiple entities including government users (such as the military), licensed users, and non-licensed users. For example, shared spectrum may be used for fixed wireless access networks. CBRS is a multi-tiered wireless band between 3.550 MHz and 3.700 MHz. In particular, CBRS is a three-tiered access framework including incumbent users (i.e., federal, military, and the like), priority access license (PAL) users (winning auction bidders), and general authorized access (GAA) users, where the GAA users are permitted to use any portion of the CBRS spectrum not assigned to a higher tier user and may also operate opportunistically on unused priority access spectrum. Availability of CBRS spectrum dynamically changes depending on use by higher priority entities. Higher tier users are protected from lower tier users using the centralized SAS 1140, which may be a federal or commercial entity. The SAS 1140 authorizes or grants spectrum to CBSDs and performs interference management to protect higher tier users. This protection may include, for example, dropping CBSDs which are GAA users. In summary, CBRS is an interference limited network which means that the performance of the network and the data sent to CBRS subscribers is limited by the amount of interference the CBRS users or subscribers experience in the frequency band of operation.

The mobile devices 1400 and 1410 can be, but is not limited to, a dual SIM device, end user devices, cellular telephones, Internet Protocol (IP) devices, mobile computers, laptops, handheld computers, personal media devices, smartphones, notebooks, notepads, vehicles, sensors, and the like which can access and operate with at least one of the shared spectrum network 1100 and the licensed spectrum network 1200. The mobile devices 1400 and 1410 have a unicast communication mode and a D2D communication mode, i.e., they are D2D communication capable devices which can communicate with other D2D communication capable devices on the millimeter wave spectrum allocated on the millimeter wave network 1300. The mobile devices 1400 and 1410 can include discovery mechanisms for sensing the other D2D communication capable devices. The mobile devices 1400 and 1410 can include self-monitoring mechanisms for determining whether D2D communications are active or idle based on idle time period thresholds.

The CBSDs 1110, 1120, and 1130 can be a base station, an access point, an access node, or like device which enables radio communications access to the mobile device 1400 and 1410, for example. The CBSDs 1110, 1120, and 1130 can connect or register with the MAS 1310 to collectively allocate millimeter wave spectrum to mobile devices requesting D2D communication mode such as, for example, the mobile device 1400 and 1410.

The base stations 1210 and 1220 can be a node-B, an evolved node-B, an access point, an access node or like device which enables radio communications access to the mobile device 1400 and 1410, for example. The base stations 1210 and 1220 can connect or register with the MAS 1310 to collectively allocate millimeter wave spectrum to mobile devices requesting D2D communication mode such as, for example, the mobile device 1400 and 1410.

The communications between the user devices 1400 and 1410, particular CBSDs 1110, 1120, and 1130, particular base stations 1210 and 1220, the MAS 1310, and the SAS 1140, as appropriate and applicable, may include wired communications, wireless communications, or a combination thereof. In an implementation, the architecture 1000 may execute the techniques described in FIGS. 3-5.

Operationally, the CBSDs 1110, 1120, and 1130 can be granted CBRS or shared spectrum by the SAS 1140. The CBSDs 1110, 1120, and 1130 and/or the base stations 1210 and 1220 can connect or register with the MAS 1310. Mobile devices, such as mobile devices 1400 and 1410, register with appropriate base stations, such as the CBSDs 1110, 1120, and 1130, and the base stations 1210 and 1220. Registration includes, for example, indicating D2D communication capabilities. Each of the base stations provides number of D2D communication capable devices, mobile device identification, and base station location to the MAS 1310. The MAS 1310 can determine location estimations for each of the D2D communication capable mobile devices to determine a device density or device location map. The device density can be used, for example, to send appropriate spectrum. For example, a lot of devices in close proximation can use higher frequencies due to the mobile devices being close to each other. The device location map can be used by the MAS 1310 to assign non-neighboring spectrum to neighboring mobile devices, for example.

Mobile devices, such as the mobile devices 1400 and 1410 send requests to a base station, such as one of the CBSDs 1110, 1120, and 1130, or the base stations 1210 and 1220 to enable D2D communication mode and assign millimeter wave spectrum. Assuming the D2D communication threshold is met, the base station sends the request to the MAS 1310 along with the spectrum determination parameters as appropriate. The MAS 1310 determinations what spectrum is available based on the spectrum determination parameters and the location information as described herein. The spectrum allocation is sent to the base station. In implementations, the base station sends the spectrum allocation to the requesting mobile devices to enable D2D communication mode. In implementations, where the MAS 1310 is a third party provider, the base station determines spectrum allocation for each mobile device based on the mobile device type. The base station sends the allocation to the requesting mobile devices to enable D2D communication mode.

The mobile devices can then sense the other D2D communication capable devices, establish D2D communication links, and exchange data. The mobile devices self-monitor to determine that data is being exchanged beyond defined idle threshold levels. For example, the mobile devices switch to unicast transmission mode to check control data which indicates active transmission time and idle times. If the defined idle threshold level is not, the mobile devices can tell the base station that D2D communication is no longer needed. The base station will return the mobile devices to unicast mode and inform the MAS 1310 that the spectrum can be released.

Figure 2:
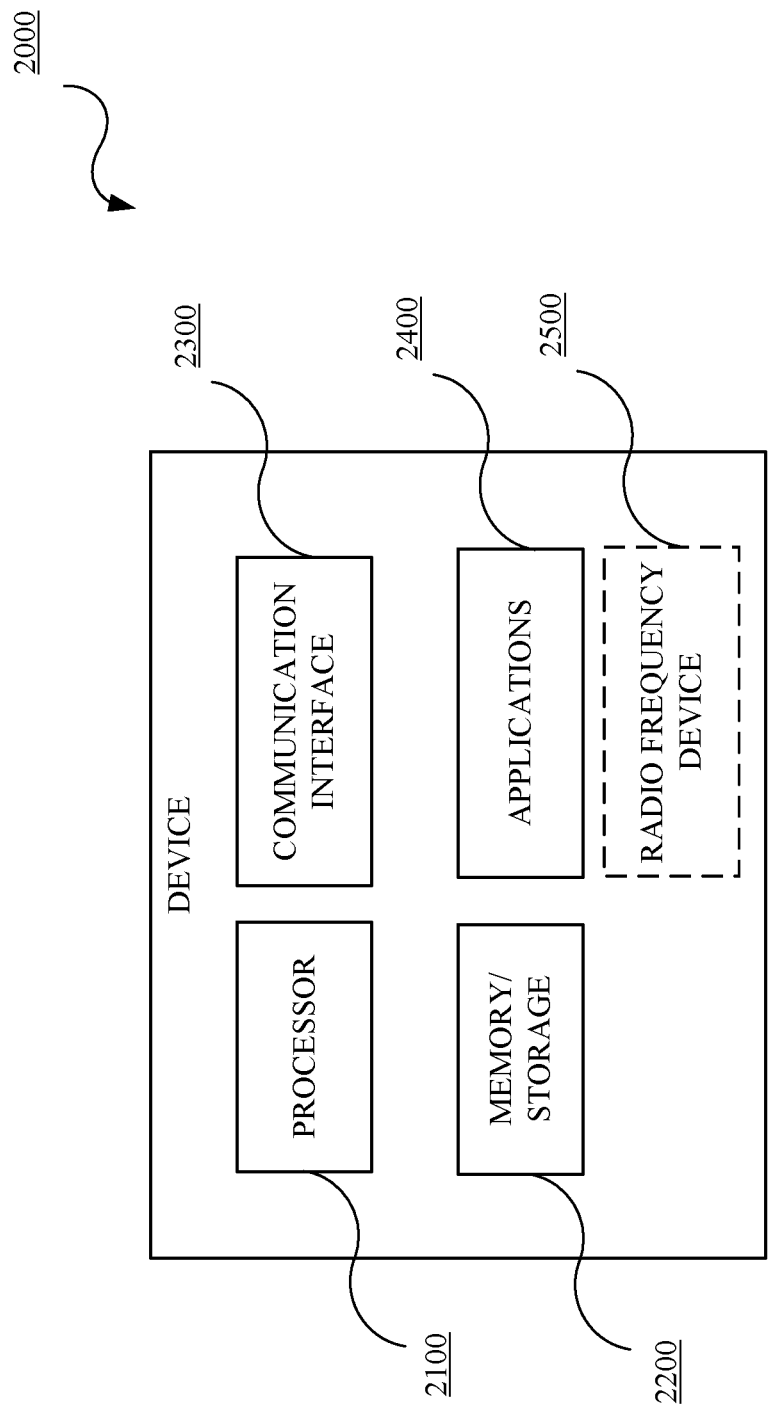
FIG. 2 is a block diagram of an example of a device in accordance with embodiments of this disclosure.

FIG. 2 is a block diagram of an example of a device 2000 in accordance with embodiments of this disclosure. The device 2000 may include, but is not limited to, a processor 2100, a memory/storage 2200, a communication interface 2300, and applications 2400. In an implementation, the device 2000 can include a radio frequency device 2500. The device 2000 can include or implement, for example, the mobile devices or terminals 1400 and 1410, the base stations 1210 and 1220, the CBSDs 1110, 1120, and 1130, the SAS 1140, and the MAS 1310. In an implementation, the memory/storage 2200 may store the power measurements, the look-up table, the SRS measurements, base station location information, mobile device location estimation, and the like and other information. The applicable or appropriate techniques or methods as described herein may be stored in the memory/storage 2200 and executed by the processor 2100 in cooperation with the memory/storage 2200, the communications interface 2300, the applications 2400, and the radio frequency device 2500 (when applicable) as appropriate. The device 2000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 3:
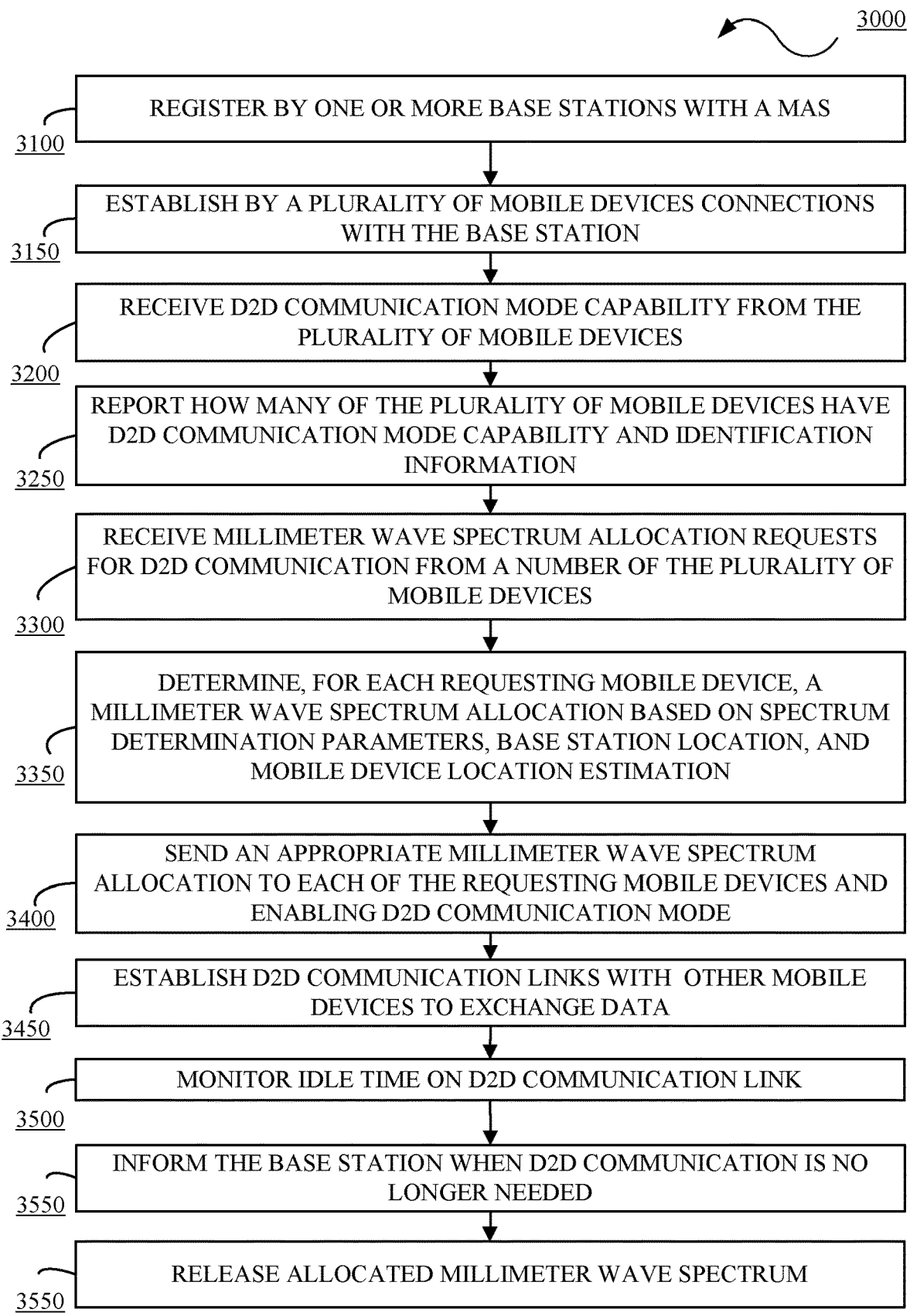
FIG. 3 is a flowchart of an example method for millimeter wave access in accordance with embodiments of this disclosure.

FIG. 3 is a flowchart of an example method 3000 for millimeter wave spectrum allocation for D2D communication in accordance with embodiments of this disclosure. The method 3000 includes: registering 3100 by one or more base stations with a MAS; establishing 3150 by a plurality of mobile devices connections with the base station; receiving 3200 D2D communication mode capability from the plurality of mobile devices; reporting 3250 how many of the plurality of mobile devices have D2D communication mode capability and identification information; receiving 3300 millimeter wave spectrum allocation requests for D2D communication from a number of the plurality of mobile devices; determining 3350, for each requesting mobile device, a millimeter wave spectrum allocation based on spectrum determination parameters, base station location, and mobile device location estimation; sending 3400 an appropriate millimeter wave spectrum allocation to each of the requesting mobile devices and enabling D2D communication mode; establishing 3450 D2D communication links with other mobile devices to exchange data; monitoring 3500 idle time on the D2D communication links; informing 3550 the base station when D2D communication is no longer needed; and releasing 3600 allocated millimeter wave spectrum. For example, the method 3000 may be implemented, as applicable and appropriate, by the base stations 1210 and 1220, the CBSDs 1110, 1120, and 1130, the SAS 1140, the MAS 1310, the mobile devices 1400 and 1410, the device 2000, the processor 2100, the memory/storage 2200, the communication interface 2300, and the applications 2400.

The method 3000 includes registering 3100 by one or more base stations with a MAS. Base stations, CBSDs, and the like each register with the MAS. Registration can include providing location information and like information. In the case of CBSDs, each CBSD registers with a SAS to receive spectrum allocation as is well-known to one of ordinary skill in the art.

The method 3000 includes establishing 3200 by a plurality of mobile devices connections with the base station. Mobile devices attach and register with a base station as is well-known to one of ordinary skill in the art.

The method 3000 includes receiving 3300 D2D communication mode capability from the plurality of mobile devices. The mobile device provides identification information, power measurements, SRS measurements, and the like parameters. Certain of these parameters can be updated throughout the connection with the base station.

The method 3000 includes reporting 3400 how many of the plurality of mobile devices have D2D communication mode capability and identification information. The base station determines how many of the connected mobile devices have D2D communication mode capability. This value along with the identification information is sent to the MAS. In implementations where the MAS is owned or controlled by a service provider of the mobile device, the base station can provide the mobile device type.

The method 3000 includes receiving 3500 millimeter wave spectrum allocation requests for D2D communication from a number of the plurality of mobile devices. At least some of the mobile devices send requests for millimeter wave spectrum to perform D2D communications. The base station, the MAS, or combinations thereof can implement D2D communication processing if the number of requests meets or exceeds a D2D communication processing threshold. For example, the D2D communication processing threshold can be a defined percentage of the number of mobile devices connected to the base station. For example, the D2D communication processing threshold can be a defined percentage of the number of D2D communication capable mobile devices connected to the base station.

The method 3000 includes determining 3600, for each requesting mobile device, a millimeter wave spectrum allocation based on spectrum determination parameters, base station location, and mobile device location estimation. If the D2D communication processing threshold is met, then the base station sends the requests to the MAS. The MAS determines, for each request, a millimeter wave spectrum based on the spectrum determination parameters, base station location, and mobile device location estimation. The spectrum determination parameters can include mobile device type when allowed, operating spectrum, spectrum type, proximity between devices, mobile device density, and the like.

The method 3000 includes sending 3700 an appropriate millimeter wave spectrum allocation to each of the requesting mobile devices and enabling D2D communication mode. The MAS sends the millimeter wave spectrum allocation for each request to the base station when the MAS is owned or controlled by a service provider of the mobile device. Otherwise, the base station uses the mobile device type to make a final allocation and then sends the final allocation to each of the requesting mobile devices.

The method 3000 includes establishing 3450 D2D communication links with other mobile devices to exchange data. The mobile devices use well-known discovery techniques to determine other D2D communication capable devices. D2D communication links are established with discovered the other D2D communication capable devices to exchange data.

The method 3000 includes monitoring 3500 idle time on the D2D communication links. The mobile devices monitor the amount of time the D2D communication link is being used to exchange data. This can be done by switching to unicast communication mode to check the control data. The control data can include, for example, amount of time D2D communication link is in use (active time) or not in use (idle time).

The method 3000 includes informing 3550 the base station when D2D communication is no longer needed. If the idle time (either directly from the idle time or indirectly from the active time) exceeds an idle time threshold then the mobile device informs the base station that D2D communication is no longer needed and the allocated millimeter wave spectrum can be released.

The method 3000 includes releasing 3600 allocated millimeter wave spectrum. The base station informs the MAS to release the allocated millimeter wave spectrum and switches the mobile device to unicast communication mode.

Figure 4:
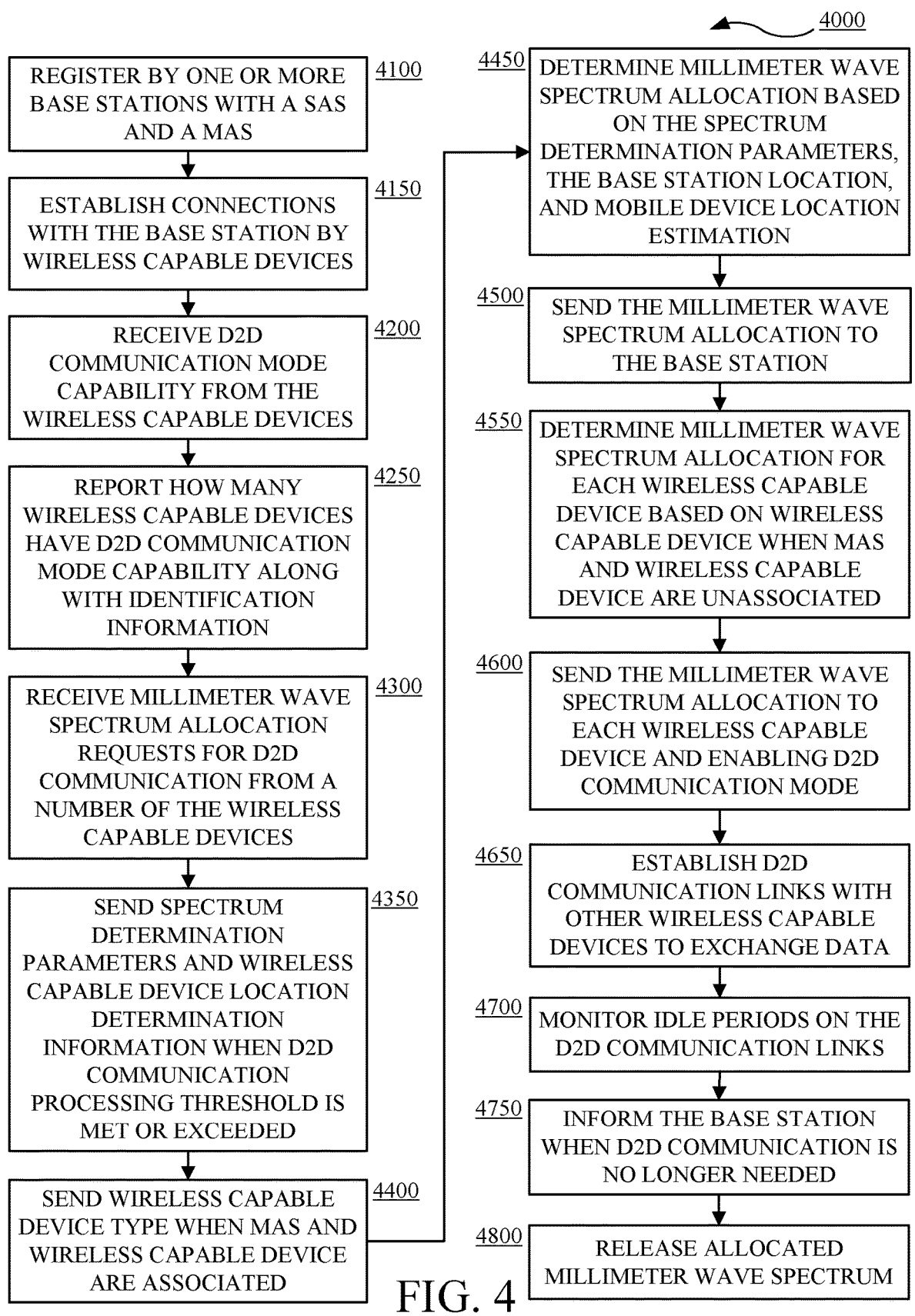
FIG. 4 is a flowchart of an example method for millimeter wave access in accordance with embodiments of this disclosure.

FIG. 4 is a flowchart of an example method for millimeter wave access in accordance with embodiments of this disclosure. The method 4000 includes: registering 4100 by one or more base stations with a SAS and a MAS; establishing 4150 connections with the base station by wireless capable devices; receiving 4200 D2D communication mode capability from the wireless capable devices; reporting 4250 how many wireless capable devices have D2D communication mode capability along with identification information; receiving 4300 millimeter wave spectrum allocation requests for D2D communication from a number of the wireless capable devices; sending 4350 spectrum determination parameters and wireless capable device location determination information when D2D communication processing threshold is met or exceeded; sending 4400 wireless capable device type when MAS and wireless capable device are associated; determining 4450 millimeter wave spectrum allocation based on spectrum determination parameters, base station location, and mobile device location estimation; sending 4500 the millimeter wave spectrum allocation to the base station; determining 4550 millimeter wave spectrum allocation for each wireless capable device based on wireless capable device when MAS and wireless capable device are unassociated; sending 4600 the millimeter wave spectrum allocation to each wireless capable device and enabling D2D communication mode; establishing 4650 D2D communication links with other wireless capable devices to exchange data; monitoring 4700 idle periods on the D2D communication links; informing 4750 the base station when D2D communication is no longer needed; and releasing 4800 allocated millimeter wave spectrum. For example, the method 4000 may be implemented, as applicable and appropriate, by the base stations 1210 and 1220, the CBSDs 1110, 1120, and 1130, the SAS 1140, the MAS 1310, the mobile devices 1400 and 1410, the device 2000, the processor 2100, the memory/storage 2200, the communication interface 2300, and the applications 2400.

The method 4000 includes registering 4100 by one or more base stations with a SAS and a MAS. CBSDs register with the SAS so as to obtain shared spectrum allocation as is well-known to one of ordinary skill in the art. CBSDs register with the MAS by providing location information and like information.

The method 4000 includes establishing 4150 connections with the base station by wireless capable devices. Wireless capable devices attach and register with a base station as is well-known to one of ordinary skill in the art.

The method 4000 includes receiving 4200 D2D communication mode capability from the wireless capable devices. The wireless capable devices provide identification information, power measurements, SRS measurements, and the like parameters. Certain of these parameters can be updated throughout the connection with the base station.

The method 4000 includes reporting 4250 how many wireless capable devices have D2D communication mode capability along with identification information. The base station determines how many of the connected wireless capable devices have D2D communication mode capability. This value along with the identification information is sent to the MAS.

The method 4000 includes receiving 4300 millimeter wave spectrum allocation requests for D2D communication from a number of the wireless capable devices. At least some of the wireless capable devices send requests for millimeter wave spectrum to perform D2D communications.

The method 4000 includes sending 4350 spectrum determination parameters and wireless capable device location determination information when D2D communication processing threshold is met or exceeded. The base station, the MAS, or combinations thereof can implement D2D communication processing if the number of requests meets or exceeds a D2D communication processing threshold. For example, the D2D communication processing threshold can be a defined percentage of the number of wireless capable devices connected to the base station. For example, the D2D communication processing threshold can be a defined percentage of the number of D2D communication capable wireless capable devices connected to the base station.

The method 4000 includes sending 4400 wireless capable device type when MAS and wireless capable device are associated. In implementations, the MAS can be owned or operated by a same entity that operates or owns the service for the wireless capable device ("associated" herein). In implementations, the MAS can be owned or operated by a third party entity.

The method 4000 includes determining 4450 millimeter wave spectrum allocation based on the spectrum determination parameters, the base station location, and mobile device location estimation. The MAS determines, for each request, a millimeter wave spectrum based on the spectrum determination parameters, base station location, and mobile device location estimation. The spectrum determination parameters can include mobile device type when allowed, operating spectrum, spectrum type, proximity between devices, mobile device density, and the like.

The method 4000 includes sending 4500 the millimeter wave spectrum allocation to the base station.

The method 4000 includes determining 4550 millimeter wave spectrum allocation for each wireless capable device based on wireless capable device when MAS and wireless capable device are unassociated. The base station determines which portion of the millimeter wave spectrum allocation is to be granted to each wireless capable device based on the wireless capable device type.

The method 4000 includes sending 4600 the millimeter wave spectrum allocation to each wireless capable device and enabling D2D communication mode.

The method 4000 includes establishing 4650 D2D communication links with other wireless capable devices to exchange data. The wireless capable devices use well-known discovery techniques to determine other D2D communication capable devices. D2D communication links are established with discovered the other D2D communication capable devices to exchange data.

The method 4000 includes monitoring 4700 idle periods on the D2D communication links. The wireless capable devices monitor the amount of time the D2D communication link is being used to exchange data. This can be done by switching to unicast communication mode to check the control data. The control data can include, for example, amount of time D2D communication link is in use (active time) or not in use (idle time).

The method 4000 includes informing 4750 the base station when D2D communication is no longer needed. If the idle periods (either directly from the idle time or indirectly from the active time) exceeds an idle period threshold then the wireless capable device informs the base station that D2D communication is no longer needed and the allocated millimeter wave spectrum can be released.

The method 4000 includes releasing 4800 allocated millimeter wave spectrum. The base station informs the MAS to release the allocated millimeter wave spectrum and switches the wireless capable device to unicast communication mode.

In general, a method for millimeter wave spectrum allocation for device-to-device (D2D) communication processing includes registering, by one or more Citizens Broadband Radio Service (CBRS) devices (CBSDs) with a millimeter wave spectrum access system (MAS), establishing, by a plurality of mobile devices, connections with a CBSD of the one or more CBSDs, receiving, by the CBSD, D2D communication mode capability from the plurality of mobile devices, receiving, by the CBSD, millimeter wave spectrum allocation requests for D2D communication from a number of the plurality of mobile devices, determining, by the MAS, millimeter wave spectrum allocation for the requests based on spectrum determination parameters, base station location, and mobile device location estimation, sending, by the MAS and the CBSD, appropriate millimeter wave spectrum allocations to each of requesting mobile device and enabling D2D communication mode, establishing, by each spectrum allocated mobile device, D2D communication links with other mobile devices to exchange data, monitoring, by each spectrum allocated mobile device, idle time on the D2D communication links, informing, the base station, when a D2D communication is no longer needed based on the idle time, and releasing, by the CBSD and the MAS, allocated millimeter wave spectrum when D2D communication is no longer needed.

In implementations, the method further includes reporting, by the CBSD, how many of the plurality of mobile devices have D2D communication mode capability along with identification information. In implementations, the method further includes receiving, by the CBSD, identification information and location estimation determination measurements from the plurality of mobile devices. In implementations, the method further includes sending, by the CBSD to the MAS, a mobile device type when the MAS and the mobile device are associated with a same service provider entity. In implementations, the method further includes initiating, D2D communication processing, when the number of the plurality of mobile devices meets or exceeds a D2D communication processing threshold. In implementations, the D2D communication processing threshold is a percentage of the plurality of mobile devices. In implementations, the D2D communication processing threshold is a percentage of the plurality of mobile devices having D2D communication mode capability. In implementations, the method further includes determining an appropriate millimeter wave spectrum allocation based on a mobile device type. In implementations, the spectrum determination parameters include mobile device type when applicable, operating spectrum, spectrum type, proximity between devices, and mobile device density. In implementations, the method further includes discovering, by each allocated spectrum mobile device, other mobile devices for exchanging data.

In general, a system includes a millimeter wave spectrum access system (MAS), a plurality of Citizens Broadband Radio Service (CBRS) devices (CBSDs) configured to register with the MAS, and a plurality of mobile devices configured to connect with a CBSD of the plurality of CBSDs. The CBSD is configured to receive device-to-device (D2D) communication mode capability from each connected mobile device and receive millimeter wave spectrum allocation requests for D2D communication from a number of D2D communication mode capable mobile devices. The MAS configured to determine millimeter wave spectrum allocation for the requests based on spectrum determination parameters, base station location, and mobile device location estimation. The MAS and the CBSD configured to send appropriate millimeter wave spectrum allocations to each requesting mobile device and enable D2D communication mode. Each spectrum allocated mobile device configured to establish D2D communication links with other mobile devices to exchange data, monitor idle periods on the D2D communication links, and inform when a D2D communication is no longer needed based on the idle period meeting or exceeding an idle period threshold. The MAS and the CBSD are configured to release allocated millimeter wave spectrum when D2D communication is no longer needed.

In implementations, the MAS and the CBSD configured to initiate D2D communication processing when the number of D2D communication mode capable mobile devices meets or exceeds a D2D communication processing threshold. In implementations, the CBSD configured to receive location estimation determination measurements from the number of D2D communication mode capable mobile devices. In implementations, the MAS configured to estimate the location of a requesting D2D communication mode capable mobile device based on a location estimation determination measurement and a location of the CBSD. In implementations, one of the MAS or the CBSD configured to determine an appropriate millimeter wave spectrum allocation based on a mobile device type. In implementations, the idle period threshold is a percentage based on active transmission time.

In general, a method for millimeter wave spectrum allocation for device-to-device (D2D) communication processing includes receiving, by one or more base stations, a shared spectrum allocation from a spectrum access system, registering, by the one or more base stations with a millimeter wave spectrum access system (MAS), establishing, by a plurality of wireless devices, connections with a base station of the one or more base stations, receiving, by the base station, millimeter wave spectrum allocation requests for D2D communication from certain D2D communication mode capable devices of the plurality of wireless devices, determining, by the MAS, millimeter wave spectrum allocation for the requests when the certain D2D communication mode capable devices meets or exceeds a D2D communication processing threshold, sending, by the MAS and the CBSD, appropriate millimeter wave spectrum allocations to each requesting wireless device to enable D2D communication mode, establishing, by each spectrum allocated wireless device, D2D communication links with other wireless devices to exchange data, monitoring, by each spectrum allocated wireless device, whether an idle transmission threshold is met or exceeded, informing, the base station, when the idle transmission threshold is met or exceeded, and releasing, by the CBSD and the MAS, allocated millimeter wave spectrum when D2D communication is no longer needed.

In implementations, the method further includes receiving, by the MAS, location estimation determination measurements from requesting wireless devices and base station location information to estimate locations of each requesting wireless device. In implementations, the method further includes determining, by one of the base station or the MAS, an appropriate millimeter wave spectrum allocation based on a wireless device type. In implementations, the method further includes sending, by the CBSD to the MAS, a wireless device type when the MAS and the wireless device are associated with a same service provider entity.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for millimeter wave spectrum allocation for device-to-device (D2D) communication processing, the method comprising:
    sending, by a D2D communication mode capable mobile device, millimeter wave spectrum allocation request for D2D communication;
    receiving, by the D2D communication mode capable mobile device, millimeter wave spectrum allocation for the millimeter wave spectrum allocation request based on at least spectrum determination parameters;
    establishing, by the D2D communication mode capable mobile device, D2D communication links with other mobile devices to exchange data; and
    informing, by the D2D communication mode capable mobile device, when a D2D communication link is no longer needed based on an idle period meeting or exceeding an idle period threshold on the established D2D communication links.

2. The method of claim 1, further comprising:
    sending, by the D2D communication mode capable mobile device, identification information and location estimation determination measurements.

3. The method of claim 1, further comprising:
    receiving, by the D2D communication mode capable mobile device, enablement for D2D communication mode.

4. The method of claim 3, wherein D2D communication processing is initiated when number of D2D communication mode capable mobile devices meets or exceeds a D2D communication processing threshold.

5. The method of claim 4, wherein the D2D communication processing threshold is a percentage of the number of D2D communication mode capable mobile devices with respect to number of mobile devices.

6. The method of claim 1, wherein the spectrum determination parameters include mobile device type when applicable, operating spectrum, spectrum type, proximity between devices, and mobile device density.

7. The method of claim 1, further comprising:
    discovering, by each allocated D2D communication mode capable mobile device, other mobile devices for exchanging data.

8. The method of claim 1, wherein the millimeter wave spectrum allocation is received from a base station connected to a millimeter wave spectrum access system (MAS).

9. The method of claim 1, further comprising:
    monitoring, by each D2D communication mode capable mobile device, the idle time on the D2D communication links.

10. A method for millimeter wave spectrum allocation for device-to-device (D2D) communication processing, the method comprising:
    receiving, by a base station, millimeter wave spectrum allocation requests for D2D communication from a number of D2D communication mode capable mobile devices;
    receiving, by the base station, millimeter wave spectrum allocation for the requests based on at least spectrum determination parameters;
    sending, by the base station, appropriate millimeter wave spectrum allocations to each requesting D2D communication mode capable mobile device and enable D2D communication mode; and
    receiving, by the base station, a message that D2D communication mode is no longer needed based on an idle period meeting or exceeding an idle period threshold on established D2D communication links.

11. The method of claim 10, further comprising:
    registering, by one or more base stations, with a millimeter wave spectrum access system (MAS).

12. The method of claim 11, wherein the millimeter wave spectrum allocation is received from the MAS.

13. The method of claim 11, further comprising:
    reporting, by the base station to a millimeter wave spectrum access system (MAS), a value representing the number of D2D communication mode capable mobile devices.

14. The method of claim 11, further comprising:
    sending, by the base station to the MAS, a mobile device type when the MAS and the D2D communication mode capable mobile device are associated with a same service provider entity.

15. The method of claim 10, further comprising:
    releasing, by the base station, allocated millimeter wave spectrum when the D2D communication mode is no longer needed.

16. The method of claim 10, further comprising:
    receiving, by the base station, identification information and location estimation determination measurements from the number of D2D communication mode capable mobile devices.

17. A system comprising:
    a plurality of Citizens Broadband Radio Service (CBRS) devices (CBSDs) configured to register with a millimeter wave spectrum access system (MAS),
    wherein each CBSD is configured to:
        receive, from D2D communication mode capable mobile devices, millimeter wave spectrum allocation requests for D2D communication;
        receive, from the MAS, millimeter wave spectrum allocation for the millimeter wave spectrum allocation requests based on at least spectrum determination parameters;

send, to each requesting D2D communication mode capable mobile device, appropriate millimeter wave spectrum allocation and enable D2D communication mode; and receive, from a D2D communication mode capable mobile device, a message that D2D communication mode is no longer needed based on an idle period meeting or exceeding an idle period threshold on established D2D communication links.

18. The system of claim 17, wherein the CBSD is configured to release allocated millimeter wave spectrum when the D2D communication mode is no longer needed.

19. The system of claim 17, wherein the CBSD is configured to receive location estimation determination measurements from the D2D communication mode capable mobile devices.

20. The system of claim 17, wherein the spectrum determination parameters include operating spectrum, spectrum type, proximity between D2D communication mode capable mobile devices, and D2D communication mode capable mobile device density.

\* \* \* \* \*